Oct. 4, 1960  H. HIGER  2,954,938
MACHINE FOR CUTTING OR DISINTEGRATING MATTER
Filed Feb. 7, 1955  4 Sheets-Sheet 1
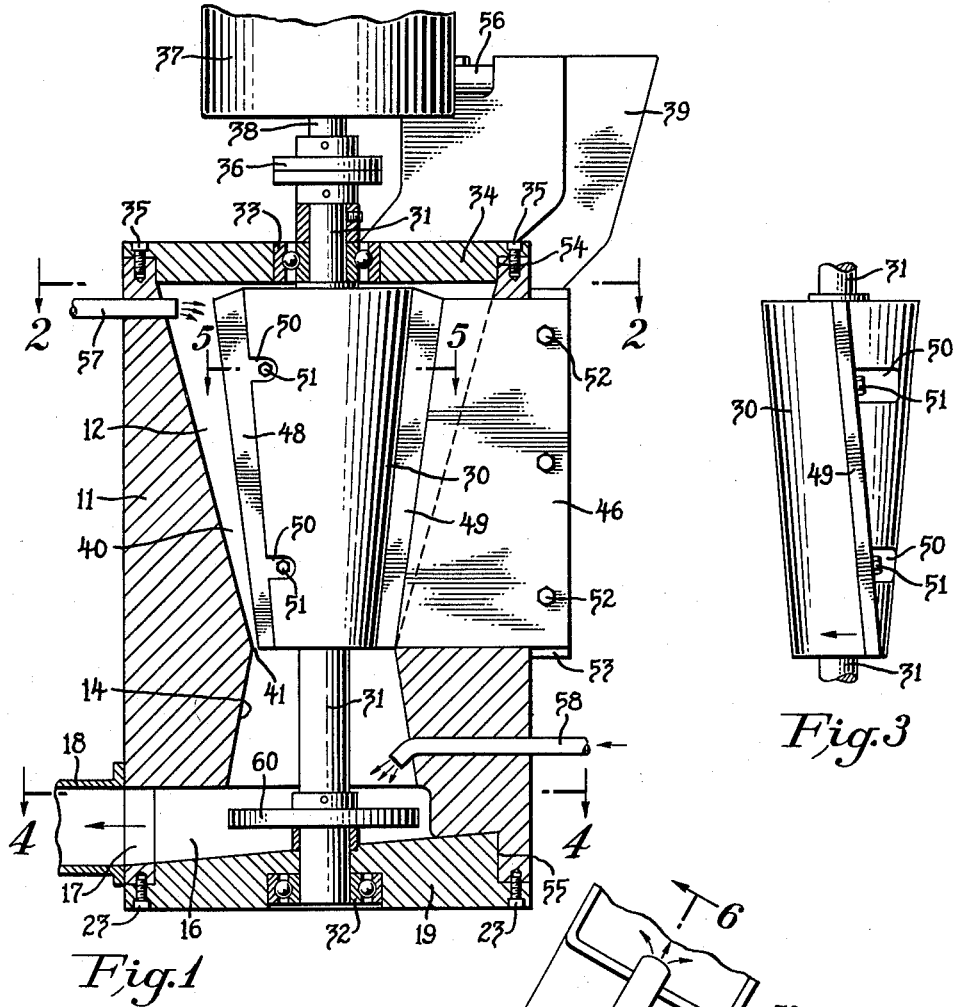
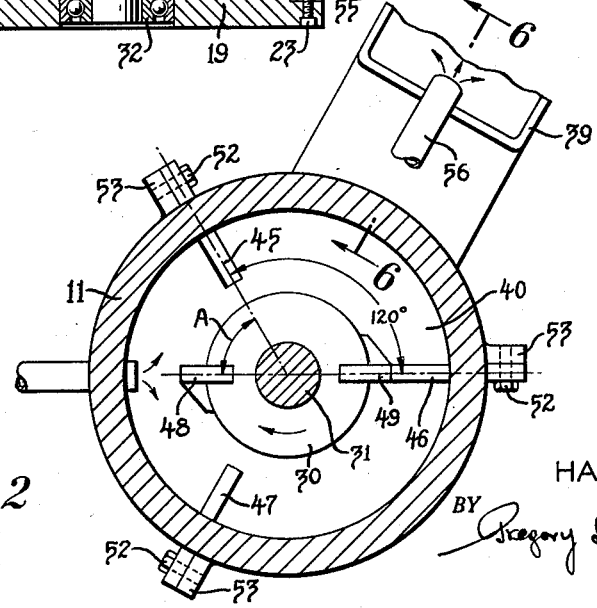
INVENTOR.
HARRY HIGER
BY
Gregory S. Dolgorules
ATTORNEY.

Oct. 4, 1960 H. HIGER 2,954,938
MACHINE FOR CUTTING OR DISINTEGRATING MATTER
Filed Feb. 7, 1955 4 Sheets-Sheet 2

INVENTOR.
HARRY HIGER
BY
Gregory L. Dolgenukas
ATTORNEY.

INVENTOR.
HARRY HIGER
BY Gregory S. Dolgorukov
ATTORNEY.

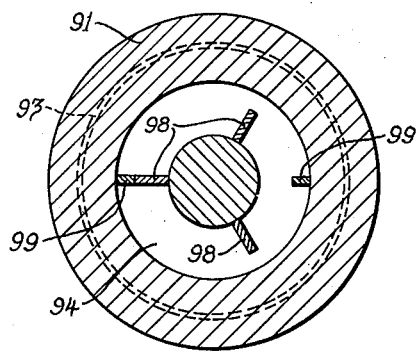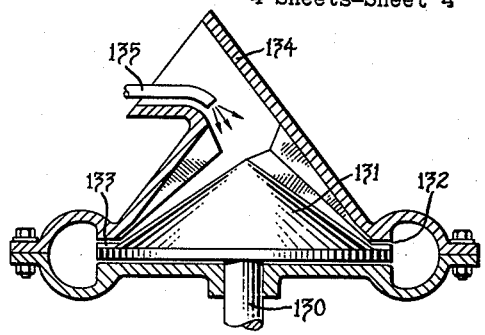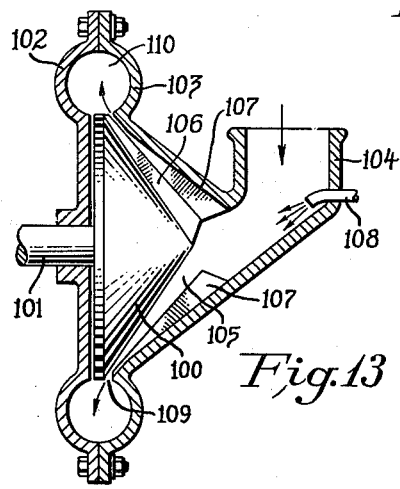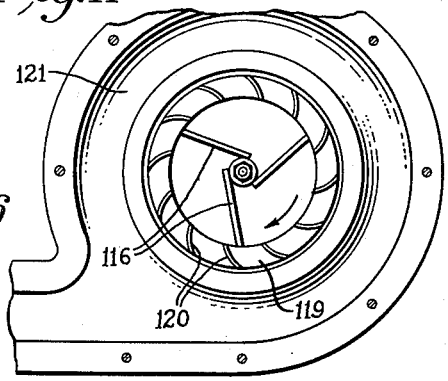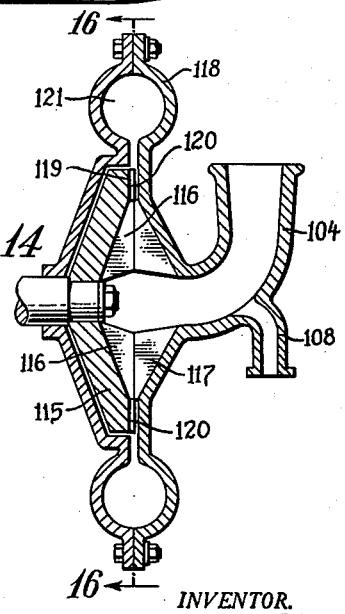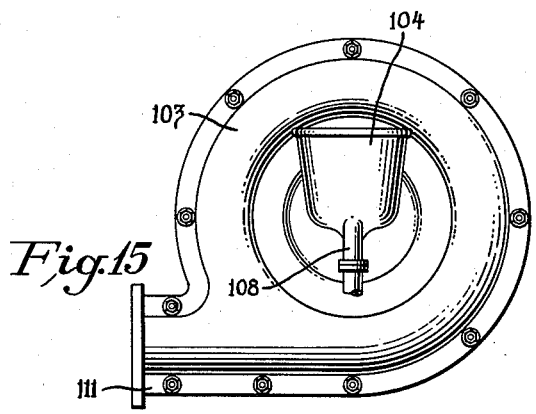

United States Patent Office 2,954,938
Patented Oct. 4, 1960

2,954,938

MACHINE FOR CUTTING OR DISINTEGRATING MATTER

Harry Higer, 3347 Webb, Detroit 6, Mich.

Filed Feb. 7, 1955, Ser. No. 486,368

12 Claims. (Cl. 241—260)

This invention relates to machines for cutting or disintegrating matters for disposal purposes or for carrying out steps of various industrial processes. The invention has a particular, but not exclusive, reference to a machine for cutting or disintegrating various refuse matters, such as garbage which may contain pieces of matter difficult to cut, such as small pieces of wood, nails, bones, broken glass, feathers, corn husks, and the like. The present application is a continuation-in-part of my co-pending applications, Serial No. 352,882, filed May 4, 1953 for Disposal Apparatus now abandoned; and Serial No. 420,286, filed on April 1, 1954 for Disposal Apparatus, now U.S. Patent No. 2,846,155.

A number of home garbage disposal units have been devised. While such units operate successfully in disintegrating soft matter such as pieces of meat, or vegetables, many of them cannot crush even small bones, corn husks and cobs, olive pits, broken glass, and the like, and become easily clogged by such matter as feathers, paper and rags. Thus, while such units decrease somewhat the amount of garbage that has to be collected by the city, they do not eliminate the need for garbage can and all that goes with it.

One of the objects of the present invention is to provide an improved cutting or disintegrating machine whereby the difficulties and disadvantages explained above are overcome and largely eliminated and matters such as referred to above can be disposed of either on large scale such as in municipal garbage collecting plants, or intermediate scale such as by hotels, restaurants, super-markets, poultry dressing establishments, and the like, or on small scale such as in a family home, as the matter is produced, i.e., without permitting the matter to stand for periods of time that may result in commencement of decay process.

A further object of the present invention is to provide an improved machine or apparatus for cutting or disintegrating matter such as garbage of the nature described above, i.e., relatively soft food refuse with occasional larger and harder pieces, which machine while capable of cutting the matter into fine particles such as ¼" or ½" in its larger dimension or even smaller, does not possess delicate cutting edges or members liable to be broken or chipped off in cutting such occasionally found hard and somewhat larger than normal pieces.

A still further object of the present invention is to provide an improved machine or apparatus of the nature specified in the preceding paragraph, which machine is capable of both rough and fine cutting within practically desired limitations even when made of a relatively small size, such as of a size making it suitable for use as home garbage disposal units.

A still further object of the present invention is to provide an improved cutting or disintegrating machine or apparatus which is of exceedingly rugged construction even when made of a small size, and is capable of cutting such matter as feathers and the like, and yet crush relatively hard pieces such as medium strength bones, pieces of glass, sticks of wood with nails, and the like.

A still further object of the present invention is to provide an improved cutting or disintegrating machine in which pieces to be disintegrated are progressively cut in two until their size is reduced to a predetermined value determined by the grading discharge opening of the machine, whereupon such particles are discharged from the machine without permitting them to accumulate and back up in the machine.

A still further object of the present invention is to provide an improved cutting or disintegrating machine which does not get hot in operation because of the friction and cutting effort and in which the cutting members remain cool and clean under all practical operation conditions.

A still further object of the present invention is to provide an improved cutting or disintegrating machine which operates at a relatively high speed and, therefore, has high production capacity and requires only a relatively small reduction in speed from standard motors, whereby expensive speed reducing devices, such as gears, chains and the like, necessary for production of high torque at low speeds are not necessary, which condition makes it possible to effect desired speed reduction from driving motor to the machine merely with the aid of pulleys and V-type belts.

A still further object of the present invention is to provide an improved cutting and disintegrating machine in which centrifugal force is utilized to effect or assist in moving of the matter from the inlet to the discharge, whereby necessity of downward feed in the machine may be eliminated under a number of conditions, and the machine may be made to operate in effect, as a centrifugal pump which not only moves but also effects cutting of the matter drawn in partly by the suction produced by the machine itself.

It is an added object of the present invention to provide an improved machine or apparatus of the foregoing nature which is simple and rugged in construction, safe and dependable in operation, and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

In accordance with the invention I completely discard the former practice of effecting cutting of pieces constituting disposal matter or other matter to be disintegrated or cut, by cutting portions from the outer surface of such pieces, i.e., separating smaller particles from the whole piece. In accordance with the present invention I provide means for effecting repeated or successive cutting of the piece into two substantially equal portions. In other words, in accordance with the present invention, I provide improved apparatus or machine in which a piece is first cut in two substantially equal portions, whereupon each half is cut into two quarters; each quarter is cut into two eighths; each eighth is cut into two sixteenths, and so on until the portions reach the desired size determined by the grating outlet whereby such particles are discharged. It is preferable to have the matter cut with its passage or flow being facilitated by ample supply of water or to have matter in substantially fluid state, such as premixing it with sufficient amount of water or other liquid. It should be understood however, that the amount of water should not be so excessive as to cause the machine to have within its hollow a solid mass of water, whereupon the machine may operate in part as a water brake wasting considerable power.

In accordance with the invention, the means effecting

"progressive cutting in two" comprise two relatively movable members recessed to provide between them a wedging or converging recess, the wider end of which is adapted to receive the matter to be cut and to pass it toward its narrower or discharge end. On each of said members I provide a plurality of blades projecting from the member inwardly of the recess substantially to the middle thereof and extending substantially through the entire length of the recess, i.e., from its receiving end to its discharge end.

Passing of the matter from the receiving to the discharge end of the recess is induced either by gravity of the matter aided with water, and/or by centrifugal force. In addition, arrangement of the blades may also be such as to operate to contribute or aid in moving the matter cut and to be cut toward the discharge end of the machine.

In accordance with the invention a piece falling into the recess will fall as far as its size will permit it to go. Thereupon, such piece is cut in two, and each half falls further down as far as the wedging recess permits each half to go, wherein each half is cut into two quarters with each quarter falling down still further, and so on.

It will be understood particularly, that the terms "cutting in two" or "cutting in two substantially equal parts" are used herein for the purpose of description and not of limitation. Said terms are employed to describe a condition or construction in which a piece of a generally round shape fully wedged in a recess is cut into substantially two equal portions providing the line of cutting, i.e., meeting of the blades extends substantially along bisector of the angle representing cross section of the wedging recess. Obviously, an elongated piece in an inclined position may, because of such form and/or position, have only a relatively small portion or portions cut off from one or both of its ends. Moreover, a hooked shape piece wedged in the recess may have both of its ends cut off and thus be actually cut into three portions rather than two. Therefore, irregularities of shapes of the matter to be cut and positioning of pieces of peculiar forms in the recess should not obscure the above disclosed concept.

The relatively movable members may be straight and movable in a reciprocal manner, or they can be concentric, one inside of the other, with one or both members being rotatable relative to each other. Either both or only one of the two members may be recessed to form a wedging recess. In the case of concentric members the wedging recess may be annular in its shape. Such an annular recess may be formed by having an outer member recessed to have a downwardly converging hollow, with the inner member being either cylindrical or in the form of an upwardly converging cone; also, with sufficient angle of convergence on the recess of the outer member, the inner member may be in the form of a downwardly converging cone. It is preferable to have the annular converging recess so disposed that it converges downwardly in order that movement of the matter toward the discharge end of the recess is aided by gravity. However, when centrifugal force of rotation is taken advantage of, the annular recess may be arranged either in a horizontal plane or in a vertical plane. In other words, the axis of the rotatable member may be either vertically or horizontally disposed. Also, such axis may be inclined to the horizontal at any advantageous angle.

In accordance with the invention means are provided whereby shearing or cutting engagement of each pair of blades is progressive and starts at the matter-receiving end of the recess and progresses toward the discharge end thereof. In addition, means are provided whereby only a portion of the blades or even only a single pair of blades is in cutting engagement at the same time. By virtue of the above expedients the power and strength requirements imposed on the machine are greatly reduced in my improved machine and constitute only a small portion of what otherwise would be required.

The angle of convergence of the recess may be so selected as to balance the capacity of the apparatus at its receiving and discharge end in order to prevent backing of the cut matter toward the receiving end of the recess.

Fig. 1 is a vertical sectional view of one form of the machine embodying the present invention.

Fig. 2 is a sectional view taken in the direction of the arrows on the section plane passing through the line 2—2 of Fig. 1.

Fig. 3 is an elevational view of the rotor of the machine of Fig. 1, shown separately, with the observer looking on one of the blades thereof.

Fig. 12 is a sectional view taken in the direction of the arrows on the section plane passing through section line 12—12 of Fig. 11.

Fig. 13 is a section taken through the longitudinal axis of a machine of modified construction.

Fig. 14 is a view similar in part to Fig. 13 but showing another machine of a modified construction.

Fig. 15 is a side view of the machine of Fig. 14, said view being taken on the matter-receiving end of the machine.

Fig. 16 is a side view of the machine of Fig. 14, with the portion of the casing having a hopper being removed to expose the rotor and illustrate the arrangement of blades-vanes and vanes on said rotor.

Fig. 17 is a vertical sectional view of a machine similar in part to the machine of Fig. 13 but arranged to have its axis vertically disposed.

Figure 4:
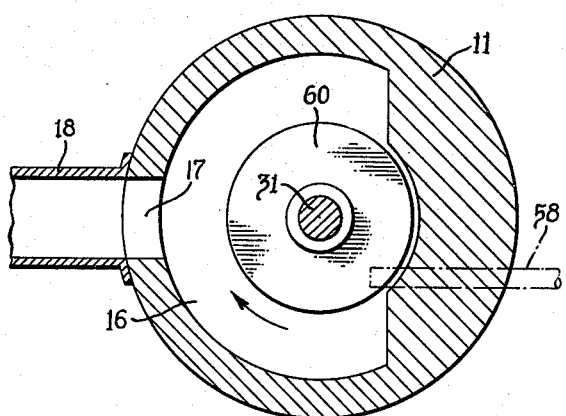
Fig. 4 is a sectional view taken in the direction of the arrows on the section plane passing through the sectional line 4—4 of Fig. 1.
Figure 5:
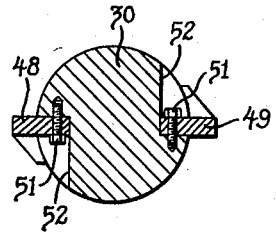
Fig. 5 is a sectional view taken in the direction of the arrows on the section plane passing through the sectional line 5—5 of Fig. 1.
Figure 6:
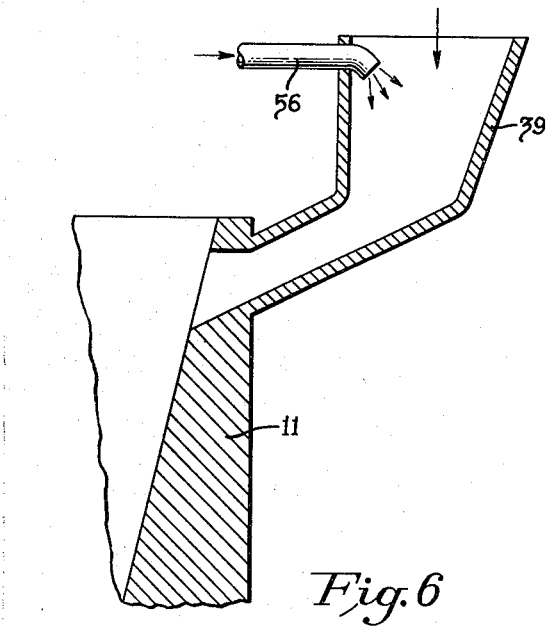
Fig. 6 is a sectional view taken in the direction of the arrows on the section plane passing through the line 6—6 of Fig. 2.

In the drawings there are shown, by way of example, cutting or disintegrating machines embodying the present invention. The machines illustrated in the drawings are all based on my inventive concept although they differ in various particulars, such as the manner of recessing concentric members for producing converging or wedging matter-receiving recesses, locality at which the matter to be cut is introduced into the machine, arrangement of the blades on the respective members between which the recess is formed, disposition of the axis of the machine vertically or horizontally, or in any intermediate position thereof, and in a number of other particulars disclosed below.

Figs. 1–8 illustrate a machine in which the annular wedging matter-receiving recess is formed by recessing the outer member to produce a hollow or cavity of a conical downwardly converging shape, with the inner member or rotor being also of a downwardly converging shape but with the angle of the cone being considerably smaller. Such construction is diagrammatically shown in Fig. 8, wherein the above general plan is illustrated without being obscured by the constructional details. The rotor shaft in this construction is journaled in bearings provided at both ends thereof. With such a construction it is advantageous to load the machine at one of its sides, in order to clear the upper central bearing and the motor or drive which may be provided at the top of the rotor shaft. Similarly, disposition of the cut matter is made by directing the same, upon its issuance from the lower or delivery end of the wedge recess, in a sidewise direction with slight inclination toward the discharge conduit, if design conditions permit.

Referring now specifically to Figs. 1–7 which show the above described construction with its requisite constructional details, the apparatus or machine illustrated therein comprises an outer member 11 recessed as indicated at 12 to provide a hollow or cavity of a conical downwardly converging shape. The lower end of the cavity 12 merges with the upper end of a bore 14 which may be of a downwardly diverging conical shape, with bores 12 and 14 being coaxial. The lower end of the bore 14 merges with the upper end of a semi-circular chamber 16, see Figs. 1 and 4. An outlet 17 leads from the chamber 16 into a drainpipe 18 which, in turn, may lead to any desired locality, such as into a sewer. A bottom plate 19 sloped toward the outlet 17 is connected to the outer member 11 in any suitable manner, such as with the aid of screws 23, to close sealingly the lower end of the above described composite recess.

Within the hollow or recess formed between bores 12 and 14, there is operatively mounted for rotation an inner member or rotor 30 of a conical downwardly converging shape and having a shaft 31, the lower end of which is journaled in a bearing 32 provided in the bottom plate 19. The upper end of the rotor shaft 31 is journaled in a bearing 33 provided in a cover 34 which covers the top of the hollow or bore 12 and is secured to the member 11 in any suitable manner such as with the aid of screws 35. To the upper extremity of the rotor shaft 31 there is operatively connected for driving through a coupling 36 an electric motor 37, the housing of which is connected to the structure of the machine in such a manner as to anchor the same for proper rotation of its armature shaft 38.

Because of the provision of the member 11 recessed as described above and of a rotor 30 mounted concentrically therein, there is provided between the member 11 and the rotor 30 an annular wedging recess of downwardly converging nature, which is adapted to receive the matter at its wide upper end, in the present embodiment of the invention through a hopper 39 mounted on the cover 34 at a suitable aperture provided in said cover.

It will now be seen in view of the foregoing that pieces of matter entering the recess 40 will pass down in said recess 40 as far as the size of each respective piece will permit, whereupon each piece will stop because of becoming wedged in between the converging walls forming the recess 40.

In accordance with the invention means are provided to cut in two a piece so lodged in the recess, and to cause the smaller piece thus produced to fall further down into the recess 40, again to be cut in two and fall down further, with such progressive cutting in two continuing until the size of the pieces is reduced by such repeated cutting to such a dimension that such small pieces can pass through the annular opening 41 forming, in effect, the grading outlet and be thus discharged from the recess 40.

Figure 7:
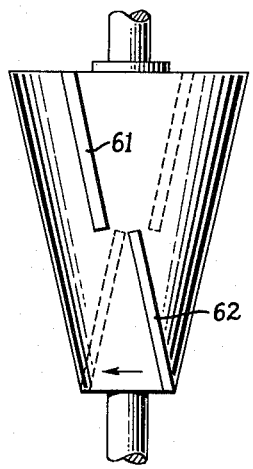
Fig. 7 is an elevational view similar in part to Fig. 3 but showing modified construction of the rotor blades.

The cutting means are exemplified by a plurality of blades projecting from the outer member 11 and from the rotor 30 inwardly of the recess 40 and meeting substantially along the bisector of the vertical cross section of the recess 40. The blades extend substantially throughout the entire length of the recess 40 and may be either of an integral construction as shown in Fig. 3 or be made in parts as shown in Fig. 7. In the present embodiment of the invention there are provided three radially extending blades 45, 46 and 47 on the outer member 11, as is best shown in Fig. 2, and two blades 48 and 49 provided on the rotor 30. As can be seen from an examination of Fig. 2, all of these blades extend radially of the machine. It will be understood, however, that the blades either on the outer member or on the rotor, or both, may be offset from the center to provide different rake angles or degree of sharpness of the cutting edges thereof. By such an expedient the cutting edges of the blades may form in section obtuse angles or acute angles, or 90 degree angles, as may be desired for cutting a particular material. It will also be understood that while the body of a blade may extend radially, its edge may be ground on any desired cutting angle.

Means are provided to eliminate occurrence of a condition when all of the blades of the apparatus cut at the same moment of time. By such an expedient the energy cycle in the apparatus is extended as evenly as practicable throughout the entire revolution of the machine. In the present embodiment of the invention such result is attained by a special arrangement of the blades both in a sectional view of the machine, such as Fig. 2, as well as in their longitudinal arrangement, as shown in Fig. 3.

As shown in Fig. 2, the number of blades on the outer member 11 and the rotor 30 is not the same. In the embodiment illustrated, three blades are provided on the outer member 11, while only two blades are provided on the rotor 30. By virtue of such an expedient only one pair of the blades is in cutting engagement at one time, i.e., only one blade of the rotor is in cutting contact with one blade of the casing 11. Therefore, the entire power of the machine is delivered to such single blade for cutting the piece which is wedged in the recess between such pair of blades. As can be seen from examination of Fig. 2, in the position of the operative parts illustrated therein, blades 46 and 49 are in cutting engagement or contact, while there is no cutting engagement between the remaining blades of the machine. Thus, the entire power of the machine is delivered to the blade 49. With rotation of the machine in the direction indicated by the arrow, the next cutting contact will be between the blades 48 and 45, with such contact occurring after rotation of the rotor through the angle A which is approximately 60 degrees, which angle is equal to one-half of the angle between the blades on the member 11.

Thus, a cutting contact between a pair of blades occurs in my improved machine having arrangement of blades shown in Fig. 2, at each 60 degrees of its rotation and, therefore, six times during a single revolution. It will be understood that if three blades were provided also on the rotor and such blades were evenly spaced for the purpose of dynamically balancing the rotor, there would be three simultaneous cutting contacts upon turning of the rotor through the angle of 120 degrees, i.e., three times during a single revolution. Thus, while there would be the total of nine cutting contacts during a single revolution, they would occur at three moments of time during a single revolution. There thus would be three pairs of blades in cutting engagement at one time, and, therefore, the power of the machine would be divided between them. Thus, one one-third of the power of the machine would be delivered to each blade of the rotor.

It will now be seen in view of the foregoing that by virtue of such an expedient, the required power and strength of the machine is cut to approximately one-third of what otherwise would be required in the example discussed above.

It will also be appreciated that the above explained advantage may also be attained providing less blades on the outer member than on the rotor. For instance, three blades may be provided on the rotor, with only two blades provided on the outer member 11. It should also be understood that in addition to the power requirements and the strength requirements on the machine, the above expedient also greatly improves operation of the machine by reducing shaking or vibration of the machine and eliminating rough powerful vibrations that would be set up in the machine if all of its blades would come into a simultaneous cutting contract with hard pieces between them. Stalling of the machine and burning out of its electric motor are also eliminated.

The above advantage is accentuated still further by causing a progressive cutting engagement between the cutting edges of a pair of blades in cutting contact, such as blades 46 and 49 in Fig. 2. As can be seen from examination of Figs. 2 and 3, the cutting contact between a pair of blades starts at the top of the recess 40 and progresses downwardly therefrom. In the present embodiment of the invention, such progressive cutting contact is attained by offsetting the blades on the rotor longitudinally, and particularly by bringing the upper end of the blade forwardly with respect to the direction of rotation of the rotor, as is best shown in Fig. 3. The value of the angle of inclination is best determined by experimentation. I found that the angle of approximately 16 degrees gives good results.

It will be understood that such progressive cutting engagement of the blades may also be effected by offsetting longitudinally the blades on the casing, particularly by bringing the upper end of a blade back with respect to the direction of rotation of the rotor. Also, blades on both the outer member and the rotor may be offset in a manner explained above to produce the same progressive engagement.

It will also be appreciated that inclined arrangement of blades on the rotor also operates to throw the pieces driven by it downwardly, thus aiding in the downward movement of the matter and in wedging thereof in the recess 40.

It will now be seen that due to the cutting engagement of the blades occurring at each 60 degrees and continuing from the moment of its commencement through a certain angle of the rotation of the rotor determined by the angle of the blade inclination and the length of the blade, in the present embodiment of the invention through approximately 30 degrees, the delivery of power to the machine occurs through six periods of 30 degrees duration each, or through the total of 180 degree angle during one full revolution of the machine. It should be appreciated at this point that the above angle of 30 degrees must be distinguished from the angle of the blade inclination with respect to the axis of the machine. It will now be understood that by increasing the angle of inclination of the blades to an angle producing cutting engagement of a pair of blades through 60 degrees, cutting engagement of the blades will be made continuous through the entire revolution. Such an arrangement may be of advantage under certain conditions. It should be appreciated however, that increase of the angle of the blade inclination is limited by the requirement to balance the cutting and the pushing down function of the blades in a most advantageous manner for the best efficiency of the machine. Unduly large angle of blade inclination may cause crowding of uncut pieces toward the lower end of the machine, without cutting them.

The blades provided on the rotor 30 and the outer member 11 are secured thereto in any suitable manner such, for instance, as by providing slots in such members and securing the blades to the respective members at said slots with the aid of threaded connectors such as screws or bolts. As shown in the drawings, the blades on the rotor are arranged within slots provided in the rotor. In order to allow insertion of hexagon head cap screws 51, the rotor 30 is recessed as shown at 50. Blades on the member 11 are arranged within the slots provided therein and are secured to the body of the member 11 with the aid of cap screws 52 engaging lips 53 provided on the member 11.

For the purpose of ensuring concentricity of the rotor with respect to the casing or outer member 11, the bottom plate 19 and the cover 34 in which the respective ends of the shaft 31 of the rotor are journaled, are provided with annular centering shoulder such as 54 and 55 entering into complementary recesses provided in the casing 11.

Means are provided to ensure an ample flow of water through the machine from its delivery end to its discharge end and thus to aid in flow of the matter downwardly. I have found that provision of flow of water is of importance for a number of reasons. In addition, to washing the matter downwardly and thus aiding in the "progressive cutting in two" operation of the machine, the water also performs the following functions: it wets matter such as feathers which may or may not be sufficiently wet when loaded in the machine. Matter such as feathers are cut more easily when wet. The flow of water or other liquid also operates as a lubricant for the walls of the recess and for the blades, facilitating flow of the matter toward the lower end of the recess and decreasing the friction between the matter and the walls of the recess, as well as friction of the blades. It should also be appreciated that the energy imparted into the machine and spent in cutting is converted into heat, and unless the blades are cooled, they may become hot causing the matter to stick to them and thus interfere with their cutting function. By providing means ensuring adequate water flow, the blades of my machine always remain clean and cool. It should be appreciated at this point that oversupply of water is undesirable in my improved machine. It can be appreciated that if the recess 40 is filled with solid mass of liquid, such mass has to be sheared by the blades and the entire machine begins to operate as a water brake consuming undesirably high amount of power. Thus, while the water supply should be adequate, it should not be excessive.

In the present embodiment of the invention the water supply means are exemplified by a water supply pipe 56 emptying into the hopper 39 and aiding in washing the matter down toward the recess 40. The second water supply pipe 57 is provided at the top of the recess 40, see Fig. 1, and supplies water for the purposes of washing the matter down and perform other functions explained above. The third pipe 58 is provided to wash the cut matter through the chamber 16. All of said pipes may be connected to the water supply such as city water system and have the streams of water issue from them under a certain pressure. Means are provided to facilitate passage of the cut matter through the chamber 16 and to prevent clogging thereof. Such means are exemplified by a disc 60 mounted on the shaft 31 for rotation therewith. It can be appreciated that rotation of the disc 60 in the same direction as the rotor will operate to stir the matter in the chamber 16 and to maintain its rotative movement producing centrifugal force aiding in discharging the matter from the chamber 16 into the pipe 18 for disposal.

Fig. 7 illustrates a modified arrangement of the blades on the rotor. The difference between arrangement of blades of Fig. 3 and of Fig. 7 resides primarily in the fact that a blade of Fig. 7 is made in two sections with sections slightly offset from each other as illustrated in Fig. 7. By virtue of such an expedient, a number of advantages may be attained. For instance, the cutting engagement of the pair of such blades sections, such as blades 61 and 62, is made to continue for longer than 30 degrees and thus improving delivery of power in the machine as well as the cutting action thereof. In addition, the blades being made smaller are easier to make, or replace. Also, breakage or notching of one section would not require changing both sections, but only of the damaged section.

Figure 9:
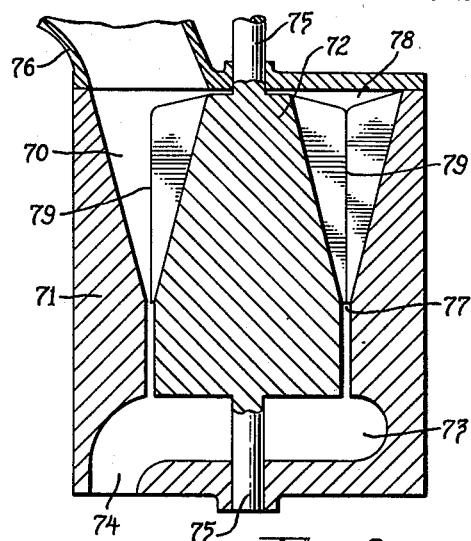
Figs. 9, 10 and 11 are diagrammatic views similar in part to Fig. 8 but showing modified constructions of my improved machine.
Figure 10:
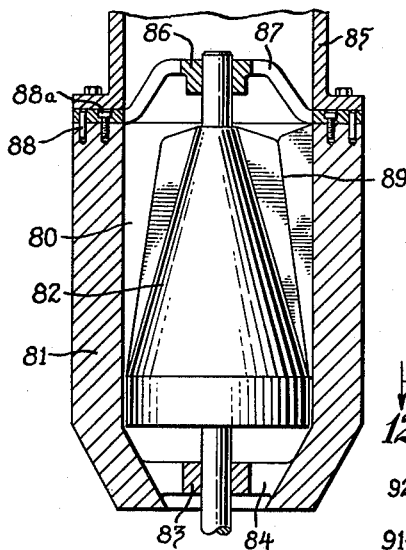
Figure 11:
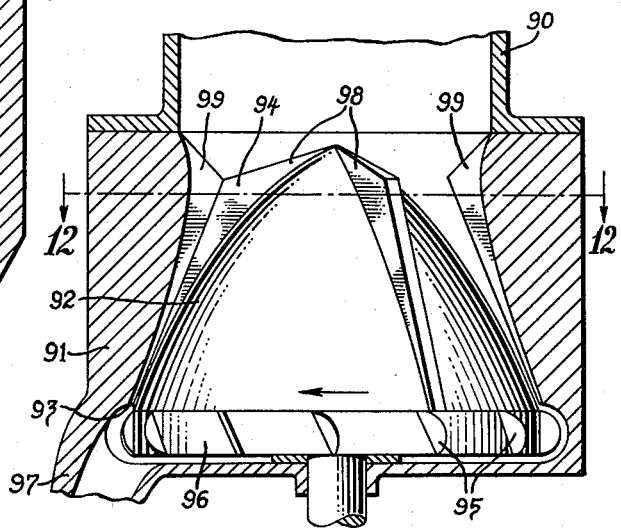

Figs. 9, 10 and 11 illustrate diagrammatically machines of the above general nature but of modified construction desired to carry out the inventive concept embodied in the machine of Figs. 1-6, in modified constructions embodying invention in its important particulars.

Figure 8:
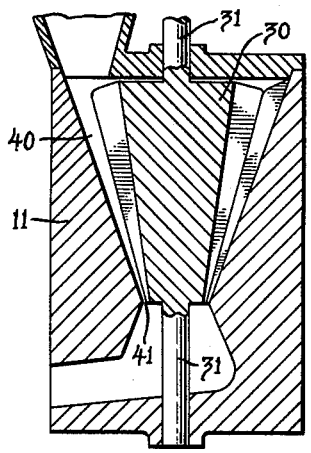
Fig. 8 is a diagrammatic view showing organization of the main parts or components of the construction of Figs. 1–7 for the purpose of comparison with the remaining figures.

Fig. 8 is inserted for the purpose of comparison with the remaining figures, and particularly Figs. 9-11. Fig. 8 illustrates the arrangement of the major components of the machine of Figs. 1-6 in diagrammatic views with its major components being designated by the same numerals as used in Figs. 1-6.

Fig. 9 illustrates a machine in which a wedge or converging recess 70 is produced by recessing the outer member 71 in a manner generally similar to that of the construction illustrated in Fig. 8, and using a rotor 72 having a body converging upwardly, instead of downwardly as in rotor 30 of Fig. 8; a disposal chamber 73 receiving cut matter is formed with a downwardly directed conduit 74 provided at the periphery of said chamber 73. The rotor 72 has a shaft 75 which is journaled at its both ends and, therefore, the hopper 76 is arranged at one side of the machine. In this particular construction, the recess and the blades operate substantially in the same manner as in the construction of Fig. 8. However, in this construction the area of the discharge and grading opening 77 of the converging recess 70 has the same mean diameter as the central area of the inlet 78 of said recess.

It will be noted that in the construction of Fig. 8, the area of the grading opening 41 having a relatively small radius is considerably smaller than that of the inlet of the recess 40. Therefore, under certain conditions the area of the grading opening 41 may not be sufficient to discharge the finely cut matter received through an area many times larger. Such a possibility is decreased in the construction of Fig. 9. It will also be noted that the construction of Fig. 9 also has an advantage in maintaining uniform the arm at which the cutting effort is applied by the blade in cutting. It will be appreciated that where a relatively strong piece has to be first cut in two, the area in shear may be at its largest and, therefore, requiring the greatest force at the blade. It will be noted that in the construction of Fig. 8 the force available at the edges of blades increases downwardly, while it may be advantageous to have it decrease downwardly where pieces are smaller and their area in shear decreases as cutting in two progresses. The arrangement of blades in the construction of Fig. 10 has the advantage disclosed above, namely, having maximum forces at the wide side of the recess. It will be noted that while in the construction of Fig. 8 the lines of cutting, i.e., lines along which the blades meet, lie in a plane which forms a downwardly converging cone, in the construction of Fig. 9 such lines designated by the numeral 79 lie in a plane which forms an upright cylinder; in the construction of Fig. 10, such lines designated by the numeral 89 lie in the plane forming an upwardly converging cone.

In the construction of Fig. 10 the inner surface of the outer member 81 is cylindrical, while the surface of the rotor 82 forms an upwardly converging cone. In spite of such a construction which may have a number of additional advantages, such as lower cost of manufacturing, a downwardly wedging or converging recess 80 is present, ensuring as in other constructions embodying the invention, wedging of the matter and its progressive cutting in two.

In the construction of Fig. 10, the rotor shaft is journaled at both of its ends. The lower bearing 83 is provided in the bridge member 84 while the upper bearing 86 is mounted in a bridge spider 87 provided at the top of the member 81 and located with respect thereto with the aid of dowel pins 88 to ensure concentricity of the bearing 86 with respect to the member 81. The spider 87 is held down to the member 81 with the aid of screws 88a. A hopper 85 is provided on the top of the machine. The bearing 86 and the spokes of the spider 87 are raised sufficiently high above the upper ends of the cutting blades to prevent whirling large pieces from striking and breaking such spokes or damaging the bearing 86. Spider 87 and bridge 84 leave sufficient openings or passages for the receipt and discharge of the cut matter. It will be noted that with such a construction the top of the machine is free from obstructions and, therefore, the matter to be cut may be loaded into the machine centrally thereof through a hopper such as 85. Thus, the receipt and discharge of the matter proceeds along substantially continuous vertical line without turns such as are found in the machines of Figs. 8 and 9. The construction of Fig. 10 is particularly advantageous in small machines, such as may be used in homes under the kitchen sinks where space requirements are limited and where in many homes the plumbing is already arranged in such a manner that discharge from the sink leads straight downwardly.

The construction of Fig. 11 possesses many of the advantages of the construction of Fig. 10. However, in this construction the inner surface provided in the outer member 91 and forming the outer wall of the converging recess is downwardly diverging and is curved, with its curvature decreasing downwardly. The recess forming surfaces of the rotor 92 are in the form of an upwardly converging body with the curvature decreasing also downwardly. It can be easily appreciated by an examination of Fig. 11 that while the width of the grading opening 93 in such a construction is relatively small, the length of it due to the large diameter of the rotor thereat is much larger than that of the area 94 of the receiving end of the recess, see Fig. 12. Thus, the total area of the grading discharge opening 93 approaches that of the receiving end of the recess, whereby the tendency of the cut matter to "back up" in the recess, i.e., tendency of the recess to become filled with cut matter, is greatly decreased and virtually eliminated. It will be appreciated that decreasing curvature of the cross section of the recess, best shown in Fig. 11 operates also in the direction of decreasing the "back up" tendency. It will be understood that by decreasing the curvature downwardly, the volume of the recess space for the cut matter is increased compared to what would result if curvature remained the same, i.e., if straight line or cone surfaces were used in forming the recess.

The rotor 92 of the construction of Fig. 11 has a shaft at its downward end only and, therefore, the top of the machine is open for central loading through the hopper 90. While in the construction of Fig. 10 the cut matter is permitted to drop down under its own weight and action of the water, in the construction of Fig. 11 the matter is circulated in a more positive manner than is the case with the disc 60 of the construction of Fig. 1. Such an operation is attained by the provision on the rim 96 of the rotor 92 of vanes 95 offset with their outer ends to trail its inner ends in rotation and, thus, to draw the cut matter, which by this time is in the form of thick liquid, outwardly and downwardly into the conduit 97 for disposal thus utilizing centrifugal force for disposal of the matter in a more positive and direct manner than is done in the construction of Fig. 1.

The construction of Fig. 11 has also an added advantage in utilizing centrifugal force to aid the flow of the matter through the wedging recess. It can be easily appreciated that the pieces driven by the blades of the rotor tend to move downward, since a downward component acting along the walls of the recess in the member 91 is created when the particles moving outwardly contact such a wall. It will be appreciated that this advantage is not found in the construction of Figs. 1–8 where the reverse is true.

In the construction of Fig. 11, as can be clearly seen in Fig. 12 giving the transverse sectional view of the construction, there are provided three blades 98 on the rotor and only two blades 99 on the casing or outer member 91. Nevertheless, the operation and the advantages of such arrangement are substantially similar to those attained with the arrangement of blades illustrated in Fig. 2. With the construction of Fig. 12 there will be cutting engagement in one pair of blades at each 60 degrees of revolution of the blade, and the total of six cutting engagement in one revolution.

It will be understood in view of the foregoing that at least one cutting blade should be provided on the inner member and at least one cutting blade on the rotor. However, it is desirable to use more than one blade on the rotor in order to dynamically balance the same.

Fig. 13 illustrates a modified construction in which the axis of the machine and of the rotor 100 is arranged horizontally rather than vertically as in the constructions described above, and therefore the centrifugal force rather than gravity is utilized for moving the matter through the converging recess of the machine.

In the construction of Fig. 13 the shaft 101 of the rotor 100 is journaled in a bearing provided in the part 102 of the casing, while the recess 105 is formed between the conical body of the rotor 100 and the conical recess of a smaller angle formed by the inner walls of the complementary casing 103 bolted or otherwise secured to the casing portion 102 and having a hollow extension 104 forming a hopper. It will now be seen that the matter loaded into the hopper 104 will fall downwardly into a converging recess 105 and will be cut and whirled around by the action of the rotating knives or blades 106 provided on the rotor 100 and cooperating with the stationary knives 107 provided on the casing 103. A stream of water from the water supply pipe 108 aids the flow of the matter through the recess 106 from its receiving end to its peripheral discharge end. The cut material is discharged through the annular grading opening 109 into a circular chamber 110 formed by the connected portions 102 and 103 forming the casing, wherefrom it is discharged through a tangential conduit 111, see Fig. 15.

Fig. 14 shows a construction generally similar to that of Fig. 13, the difference lying mainly in the construction of the rotor and the left-hand portion of the casing. In the construction of Fig. 14, the rotor 115 is in the form of a hollowed out disc having provided thereon rotating knives 116, while stationary knives or blades 117 are provided on the casing 118. On the flat peripheral surface 119 of the rotor 115 there are provided vanes 120 disposed to have their outer ends trailing, similarly to vanes of centrifugal pumps, in order to pump the cut matter which by this time, because of additional water, is in the form of mushy liquid, into the chamber 121 and into the discharge conduit such as 111 of Fig. 15. Thus, the construction of Fig. 14 combines in itself the features of my improved cutting machine and of a centrifugal pump, and is particularly advantageous when the matter to be cut may already be in semi-liquid state, such as may be a case in various industrial processes. In such a construction it is desired to set the knives in a manner illustrated in Fig. 16 to produce a strong centrifugal force driving the matter outwardly. Thus, in the construction of Fig. 16, the knives 116 act also as vanes of a centrifugal pump and drive the matter into the grading opening wherein the secondary vanes 120 operating solely as centrifugal vanes drive the cut matter through the grading opening into the chamber 121. In such a construction a particularly strong centrifugal action is produced, and yet the advantageous progressive engagement in a pair of knives or blades in cutting contact is preserved.

The construction of Fig. 17 is similar in its general arrangement to the construction of Fig. 13 an important difference being in the vertical arrangement of the shaft 130 of the rotor 131 and in the provision of an elongated grading outlet 132 in which centrifugal vanes 133 similar to the vanes 120 of the construction of Fig. 14 are provided. The matter is loaded into the machine through the hopper 134 and is aided in its downward movement by the water flow from the pipe 135. In this construction as well as in the constructions of Figs. 14 and 13, the arrangement of cutting blades may be similar to that shown in Fig. 16 to produce greater centrifugal force as explained above.

It will be understood that other arrangements of the major components of my machines may be made to produce a converging recess in which the matter passes from its wider receiving end into its narrower delivery end with progressive cutting of the matter in two.

There is thus provided an improved machine for cutting or disintegrating matter in which there is formed a converging recess through which the matter passes from the wider or receiving end to the narrower or discharge end, said matter being progressively cut in two by the cooperating knives provided on both sides of the recess and meeting substantially in the middle thereof. The knives are moved relative to each other to effect such cutting. The converging recess may be disposed vertically, horizontally or in an inclined position. When the recess is disposed vertically or in an inclined position, gravity is utilized to aid the flow of the matter. Means are also provided to produce centrifugal force to aid in flow of the matter. By the above disclosed arrangement of cutting knives, the power requirements and strength requirements on the machine are greatly decreased. Water flow aids in the passing of matter through the machine and keeps the blades cool and clean.

By virtue of such a construction the objects of the invention listed above and numerous additional advantages are attained.

I claim:

1. A refuse disposal apparatus comprising a hollow upright casing having a conical bore of downwardly decreasing diameter for a portion of its length defining a receiving compartment, and having a delivery passage terminating in a lateral outlet adapted for communication with a drain, a plurality of spaced upright radial blades secured to said casing and projecting into said compartment, a conically shaped upright rotor in said compartment journaled within said casing, a plurality of spaced elongated inclined blades secured to said rotor and projecting into said compartment with their cutting edges adapted for cooperative shearing engagement with the cutting edges of said casing blades, and a horizontally arranged disc adjacent the bottom of said delivery passage joined to and depending from said rotor for projecting cut material centrifugally outward.

2. A refuse disposal apparatus comprising a hollow upright casing having a conical bore of downwardly decreasing diameter for a portion of its length defining a receiving compartment, and having a delivery passage terminating in a lateral outlet adapted for communication with a drain, a plurality of spaced upright radial blades secured to said casing and projecting into said compartment, a conically shaped upright rotor in said compartment journaled within said casing, and a plurality of spaced elongated inclined blades secured to said rotor and projecting into said compartment with their cutting edges adapted for cooperative shearing engagement with the cutting edges of said casing blades, said delivery passage having a substantially conical shape of downwardly increasing diameter terminating in a substantially semi-circular outlet of increased diameter.

3. A refuse disposal apparatus comprising a hollow upright casing having a conical bore of downwardly decreasing diameter for a portion of its length defining a receiving compartment, and having a delivery passage terminating in a lateral outlet adapted for communication with a drain, a plurality of spaced upright radial blades secured to said casing and projecting into said compartment, a conically shaped upright rotor in said compartment journaled within said casing, a plurality of spaced elongated inclined blades secured to said rotor and projecting into said compartment with their cutting edges adapted for cooperative shearing engagement with the cutting edges of said casing blades, pipes extending into said casing at its upper and lower endes for supplying water to said bore and to said delivery passage and outlet, an upright material receiving hopper upon said casing having an outlet communicating with the upper portion of said bore, and a pipe extending into the upper portion of said hopper for delivering water down through the same.

4. A refuse disposal apparatus comprising a hollow upright casing having a conical bore of downwardly decreasing diameter for a portion of its length defining a receiving compartment, and having a delivery passage terminating in a lateral outlet adapted for communication with a drain, a plurality of spaced upright radial blades secured to said casing and projecting into said compartment, a conically shaped upright rotor in said compartment journaled within said casing, a plurality of spaced elongated inclined blades secured to said rotor and projecting into said compartment with their cutting edges adapted for cooperative shearing engagement with the cutting edges of said casing blades, said casing having upright transverse slots formed therein to receive said radial blades, and upright bosses on the exterior of said casing adjacent said slots to which said blades are bolted.

5. A refuse disposal apparatus comprising a hollow upright casing having a conical bore of downwardly decreasing diameter for a portion of its length defining a receiving compartment, and having a delivery passage terminating in a lateral outlet adapted for communication with a drain, a plurality of spaced upright radial blades secured to said casing and projecting into said compartment, a conically shaped upright rotor in said compartment journaled within said casing, a plurality of spaced elongated inclined blades secured to said rotor and projecting into said compartment with their cutting edges adapted for cooperative shearing engagement with the cutting edges of said casing blades, said casing having upright transverse slots formed therein to receive said radial blades, and upright bosses on the exterior of said casing adjacent said slots to which said blades are bolted, said rotor having inclined slots therein throughout its length within which are secured said rotor blades.

6. A refuse disposal apparatus comprising a hollow upright casing having a bore for a portion of its length defining a receiving compartment, a plurality of spaced upright radial blades secured to said casing and projecting into said compartment, an upright rotor in said compartment journaled within said casing, and a plurality of spaced elongated inclined blades secured to said rotor and projecting into said compartment with their cutting edges adapted for cooperative shearing engagement with the cutting edges of said casing blades, said receiving compartment having an outlet at its lower end of a given diameter, said casing having an intermediary portion with an elongated tapered bore of appreciable length, and of downwardly increasing diameter, the upper end of said latter bore having the same diameter as and communicating with said outlet, said casing having a bottom portion with an upright substantially semi-cylindrical outlet chamber of appreciable height communicating with said latter bore, there being a transverse recess in the wall of said bottom portion communicating with said outlet chamber defining a lateral outlet adapted for communication with the drain.

7. A refuse disposal apparatus comprising a hollow upright casing having a tapered bore for a portion of its length defining a receiving compartment, a plurality of spaced upright radial blades bolted to said casing and projecting into said compartment, an upright tapered rotor in said compartment journaled within said casing, a plurality of spaced elongated inclined blades bolted to said rotor and projecting into said compartment with their cutting edges adapted for cooperative shearing engagement with the cutting edges of said casing blades, said receiving compartments having an outlet at its lower end of a given diameter, said casing having an intermediary portion with an elongated tapered bore of appreciable length, and of downwardly increasing diameter, the upper end of said latter bore having the same diameter as and communicating with the said outlet, said casing having a bottom portion with an upright substantially semi-cylindrical outlet chamber of appreciable height communicating with said latter bore, there being a transverse recess in the wall of said bottom portion communicating with said outlet chamber defining a lateral outlet adapted for communication with a drain, pipes extending into said casing for supplying water to said bore and to said delivery passage and outlet, an upright material receiving hopper upon said casing having an outlet communicating with the upper portion of said bore, and a pipe extending into the hopper for delivering water down through the same.

8. The disposal apparatus of claim 2, said rotor blades lying in planes inclined at an acute angle to a plane passing through the longitudinal axis of said rotor.

9. The disposal apparatus of claim 2, the rotor blades being less in number than the housing blades.

10. The disposal apparatus of claim 2, there being a pair of parallel spaced laterally displaced blades upon each side of said rotor, with each blade extending throughout a portion of the length of said rotor.

11. The disposal apparatus of claim 2, said casing blades adjacent their lower ends corresponding to the lower end of said receiving compartment cooperating with the lower ends of said rotor blades for a portion of their length, thereby defining an elongated annular restricted outlet passage between said receiving compartment and the upper end of said delivery passage.

12. A refuse disposal apparatus comprising a hollow upright casing having a tapered bore for a portion of its length defining a receiving compartment, a plurality of spaced upright radial blades secured to said casing and projecting into said compartment, an upright tapered rotor in said compartment journaled within said casing, a plurality of spaced elongated inclined blades secured to said rotor and projecting into said compartment with their cutting edges adapted for cooperative shearing engagement with the cutting edges of said casing blades, said casing having upright transverse slots formed therein to receive said radial blades, and upright bosses on the exterior of said casing adjacent said slots to which said blades are bolted, said receiving compartment having an outlet at its lower end of a given diameter, said casing having an intermediary portion with an elongated tapered bore of appreciable length, and of downwardly increasing diameter, the upper end of said latter bore having the same diameter as and communicating with the said outlet, said casing having a bottom portion with an upright substantially semi-cylindrical outlet chamber of appreciable height communicating with said latter bore, there being a transverse recess in the wall of said bottom portion communicating with said outlet chamber defining a lateral outlet adapted for communication with a drain.

References Cited in the file of this patent

UNITED STATES PATENTS

| 310,418 | Halstead | Jan. 6, 1885 |
| 922,242 | Beach | May 18, 1909 |
| 1,174,656 | Beckwith | Mar. 7, 1916 |
| 1,987,941 | Mathews | Jan. 15, 1935 |
| 2,004,737 | Tonks | June 11, 1935 |
| 2,150,357 | Bond | Mar. 14, 1939 |
| 2,442,812 | Jordan | June 8, 1948 |

FOREIGN PATENTS

| 398,121 | Great Britain | Sept. 7, 1933 |
| 849,600 | Germany | Sept. 15, 1952 |